June 23, 1964 A. B. FOWLER 3,138,713
ELECTRO-OPTICAL CIRCUIT USING QUENCHING ELECTROLUMINESCENCE
Filed July 19, 1960

INVENTOR
ALAN B. FOWLER
BY Walter Katz
ATTORNEY

United States Patent Office 3,138,713

Patented June 23, 1964

3,138,713

ELECTRO-OPTICAL CIRCUIT USING QUENCHING ELECTROLUMINESCENCE

Alan B. Fowler, Wappingers Falls, N.Y., assignor to International Business Machines Corporation, New York, N.Y., a corporation of New York Filed July 19, 1960, Ser. No. 43,824
4 Claims. (Cl. 250—205)

This invention relates to electro-optical devices and more particularly to bistable electro-optical circuits which may be used in application in computing apparatus.

In general, the instant invention relates to electro-optical circuits in which certain light sensitive elements, such as electroluminescent cells, are optically coupled to photoconductive elements such that an electrical input signal applied to the electroluminescent member causes radiation therefrom, which radiation impinges on the photoconductive cell to change its operating characteristics. Electroluminescence is a well known property of certain phosphors which causes them to emit radiation when excited by a change in potential gradient across the phosphor. Similarly, illumination of a photoconductive cell is known to greatly affect the electrical resistance of such a cell. Ordinarily a photoconductor which is dark has a very high internal resistance, while one which is illuminated has a relatively low electrical resistance. A particular characteristic of some of the photoconductor elements utilized in the present invention, however, is their ability to increase their resistance state when illuminated by light of a particular wavelength. Utilizing electroluminescent elements and the photoconductors having the above-mentioned characteristic novel electroluminescent-photoconductive circuits may be constructed having particularly useful characteristics in computer circuitry.

Bistable electro-optical latch circuits used in computing apparatus are known in the art and have been described by T. G. Marshall in U.S. Patent 2,885,564, issued May 5, 1959. In an optical latch circuit of this type, sometimes known as an "option," an electroluminescent element in electrical series with an optically coupled photoconductor is adapted to be turned on by a luminant input to the PC. The input lowers the voltage drop across the PC which then through optical feedback keeps the PC at a low resistance level, thereby maintaining the EL in a lit condition.

What is described herein are parallel type latch circuits and electro-optical logical circuits in which PC elements having the characteristic of increasing its resistance upon exposure to light of a specific wavelength are utilized.

Another feature of the present invention is the provision of a latch circuit having present therein a second photoconductor which when illuminated switches the circuit from the latched to the unlatched condition.

Still another feature of this invention are novel logic circuits employing a plurality of the EL-PC type elements described herein.

Accordingly, an object of the present invention is to provide an electro-optical latch circuit arranged in parallel electrical connection.

A more specific object of the instant invention is to provide a parallel bistable EL-PC latch circuit which may be unlatched by application of an external light signal.

Still a further object is to provide a parallel bistable EL-PC latch circuit utilizing EL-quenched photoconductor elements in which the photoconductor is quenchable under particular light input conditions.

An additional object is to provide a bistable EL-PC latch circuit having present therein a photoconductor sensitive to radiation in at least two different spectral ranges, said photoconductor being conducting only in one of said ranges and quenched in the other and including an electroluminescent cell electrically coupled to said first photoconductor to irradiate said photoconductor in the spectral range in said photoconductor in a quenched state and in which said circuit elements are arranged in parallel circuit relationship.

Another object is to provide logical apparatus using electro-optical elements which include photoconductor "AND" and "OR" portions logically connected with an electroluminescent output.

The foregoing and other objects, features and advantages of the invention will be apparent from the following more particular description of preferred embodiments of the invention, as illustrated in the accompanying drawings.

Figure 1:
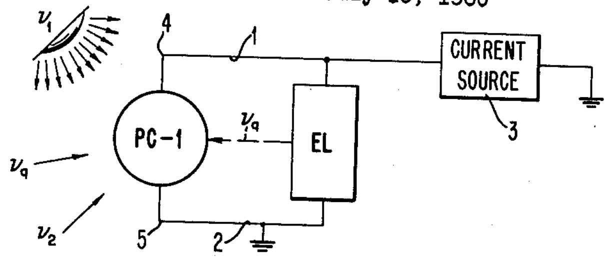
FIGURE 1 is a schematic diagram of the circuit arrangement of a parallel bistable EL-PC latch circuit constructed according to the principles of the present invention.

With reference to the drawing and particularly referring to FIGURE 1, there is shown a bistable electro-optical circuit according to the present invention which includes a photoconductor circuit element PC-1, constructed from a quenchable photoconductive material, such as cadmium sulfide, cadmium selenide or cadmium telluride, appropriately activated with impurities to be sensitive to radiation in two spectral ranges. In one of the ranges the resistance of the material is low, the so-called "conducting" state, and in the other the resistance of the material is relatively high, the so-called "quenched" or non-conducting condition of the element. The photoconductor cell may be fabricated in the form of single crystals or layers of polycrystalline material. Any appropriate method of preparation of these materials may be used to produce the photoconductor elements, such as single crystal growth from a melt, or sintering the individual powder constituents of the photoconductor at elevated temperatures.

A pair of electrically-coupled leads 1 and 2 connect PC–1 to an electroluminescent element, EL which also may be in the form of a single crystal or a polycrystalline material. Suitable EL's are made from semiconductors, such as silicon or germanium, or conventional phosphors, as for example, zinc sulfide, zinc telluride or zinc selenide activated with copper, or an appropriate neon tube, which are capable of luminescing at the spectral frequency, $\nu_q$, at which the photoconductivity of PC–1 will be quenched. For example, if the PC element is quenched in the infrared, the corresponding EL element should also luminesce in the infrared. A typical suitable combination is that of an EL composed of silicon which emits at a wavelength of one micron and a copper activated cedmium selenide PC–1 which is quenched at the corresponding wavelength.

The novel manner in which the EL-PC elements have been arranged according to the present invention will not be described. Certain circuit valves of voltage, frequency, waveshape, and impedance, are presented to illustrate the invention and in no way is the invention to be restricted thereby since other appropriate values may be used where desired or necessary.

The inputs to the EL-PC element are supplied by a constant current, high impedance, D.C. source 3 of approximately 1–2 volts. The constant current source is connected in parallel circuit relationship with PC–1 and EL–1 such that the sum of the currents passing through the elements is constant but the voltage across them depends on the conducting states of the photoconductor.

In the unlatched state of the circuit, PC–1 is exposed to ambient light of frequency $\nu_1$ under which condition its resistance is relatively low. The resistance of EL is made much higher than that of the PC-1 when it is photoconducting; therefore, the current flows predominantly through PC–1 rather than through EL. When a pulse of light radiation of wavelength $\nu_q$, hereinafter referred to as the signal or trigger light, corresponding to the quenching wavelength of element PC–1, is shone on PC–1, the photoconductivity of this element is quenched and its resistance increases accordingly. The current thereby flows through EL which thereupon luminesces at frequency $\nu_q$. EL and PC–1 are so placed that PC–1 is exposed to the quenching radiation from EL. Thus even when the signal pulse at $\nu_q$ is turned off, PC–1 remains quenched but now from radiation from EL–1 and the circuit is said to be latched in a condition in which PC–1 has a high resistance. To unlatch the circuit the switching radiation of frequency $\nu_2$ is shone on PC–1 which decreases the resistance of the PC–1 element so that now EL ceases to luminesce. Thereupon PC–1 returns to its conducting state which state may be interrogated as an output at terminals 4 and 5 or alternatively, the lit condition of EL indicated by a photocell placed in light receiving relationship to the EL.

The parallel circuit arrangements of the PC–1 and EL elements is important in the operation of the circuit in that a decrease in the resistance of PC–1 causes a corresponding decrease in the voltage across the EL element, which voltage drop is sufficient to prevent EL from luminescing.

Figure 2:
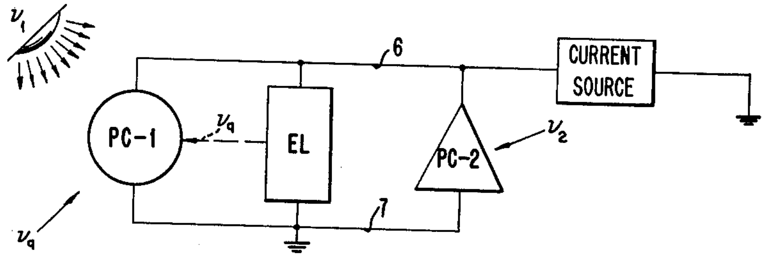
FIGURE 2 shows another embodiment of the present invention showing the provision of a second photoconductor for unlatching the circuit.

Referring now to FIGURE 2 there is shown another embodiment of the present invention. The circuit differs from that of FIGURE 1 in that a second photoconductor element, PC–2, is connected in electrical parallel relationship with the EL element through leads 6 and 7. The provision of the second photoconductor provides an alternative method for unlatching the circuit, namely, by shining light $\nu_2$ on PC–2, such that it decreases its resistance and EL ceases to luminesce. When EL ceases to luminesce PC–1 is no longer quenched and therefore it returns to its low resistance state. Accordingly, PC–2 need only have the characteristic of decreasing its resistance upon illumination with $\nu_2$.

Figure 3:
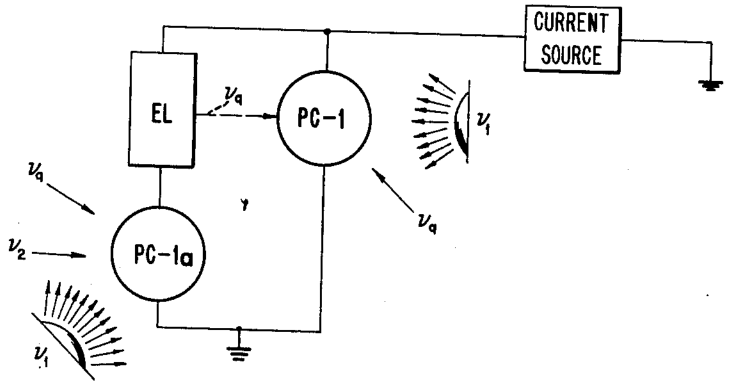
FIGURE 3 illustrates another embodiment of the feature of the invention shown in FIGURE 2.

FIGURE 3 illustrates a modification of the circuit of FIGURE 2 in which an additional quenchable PC–1*a* element is connected in electrical series relationship with the EL element and the first PC–1. When PC–1 and PC–1*a* are both exposed to ambients at $\nu_1$ and $\nu_2$, respectively, the low resistance path is presented through PC–1 and EL does not luminesce. When, however, PC–1 is quenched by radiation of frequency $\nu_q$, EL luminesces and in turn latches PC–1 into a state of high resistance. The circuit then is unlatched by quenching PC–1*a* with $\nu_q$.

A particular advantage of the bistable EL-PC circuit of the present invention as compared to those known in the art resides in the high speeds obtainable during the turning on of PC–1 on the unlatching of the circuit. In a normal photoconductive latch the turn on process (to high conductivity) may be 5–20 times faster than turn-off. In turn-on, electrons are excited from the valence band by the light but in turn-off the holes necessary for recombination with the electrons only drain out of the traps into which they have fallen by a relatively slow thermal process. In the latch device of the present invention the holes are rapidly ejected from the traps by application of the quenching radiation. Upon combination with electrons the conductivity is decreased and the photoconductor is quenched. During unlatching of the circuit by application of an external light signal, ambient light operates simultaneously to enable the high photoconductivity state to be reached in times comparable to turn-on times.

Figure 4:
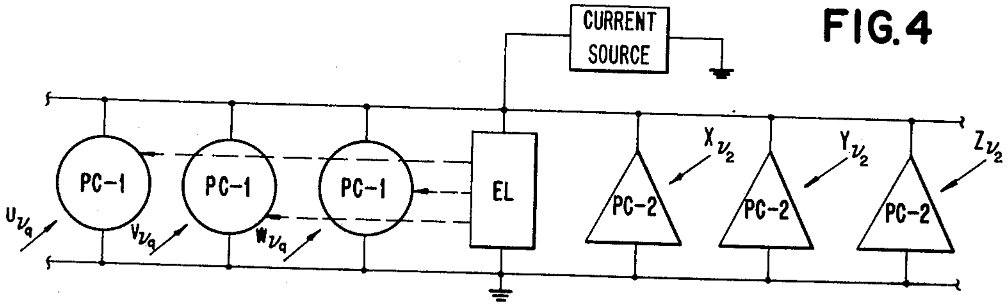
FIGURE 4 is a schematic diagram of a logical apparatus according to the present invention.
Figure 5:
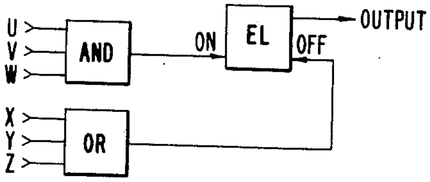
FIGURE 5 shows the equivalent circuit of FIGURE 4.

A further embodiment of the principles of the circuit of FIGURE 2 is illustrated in FIGURES 4 and 5 in which is shown apparatus for performing computer logic. The apparatus includes a photoconductor logic portion and a photoconductor control portion which are interchangeable with each other. In operation illumination from the EL element is caused to shine upon only the PC–1's which have quenching light information input signals $V_{\nu_q}$, $W_{\nu_q}$, etc. associated therewith. Similarly the PC–2's are illuminated from controlled light sources $X_{\nu_2}$, $Y_{\nu_2}$, etc. Assume that light sources $U_{\nu_q}$, $V_{\nu_q}$ and $W_{\nu_q}$ are caused to impinge upon their respective PC's in a simultaneous manner, thus presenting a high impedance path from the voltage source to ground. Assume also that at the same time no light from sources X, Y or Z is present. Under these conditions the PC–2's present a high impedance path from the voltage source to ground and the EL element illuminates. As in previously described circuits, the light from the EL element is so directed as to impinge upon the PC–1's and to hold them in the high impedance condition even though the sources U, V, W are removed, thus latching the device in the ON or illuminated condition.

Unlatching or turning OFF is accomplished by causing any one or any combination of light sources X, Y, Z to impinge upon its respective PC–2. Light impinging upon PC–4, 5 or 6 causes the illuminated PC to exhibit a low impedance path from the voltage source to ground thus extinguishing the EL.

The presence of light source X, Y, or Z prevents EL from being latched or turned ON, even though light sources U, V, and W are present, since PC–4, 5 or 6 presents a low impedance path from the voltage source to ground in parallel with EL.

In computor operation for example, U may represent a multiple operation wherein V is the positive sign of the multiplier and W the positive sign of the multiplicand. Thereby the lit or ON condition of the circuit indicates that the product is positive. Sources X, Y or Z function to reset this information after it had been interrogated.

In essence, as shown in the equivalent circuit of FIGURE 6, the PC–1's act as a three legged AND circuit and PC–2's as an OR circuit, wherein one circuit performs logic and the other functions as a control, the condition of the EL element representing a logical combination of the two circuits.

As will be apparent to those skilled in the art, a wide number of conventional phosphors may be used for PC–2. Furthermore, PC–2 may be of the same material as PC–1. For example, when copper activated cadmium selenide is used as PC–2 the $\nu_2$ light pulse associated therewith is 0.525 micron. Similarly the ambient light $\nu_1$ associated with PC–1 is also of the same wavelength when PC–1 is constructed of the same material as PC–2.

While the invention has been particularly shown and described with reference to preferred embodiments thereof, it will be understood by those skilled in the art that various changes in form and details may be made therein without departing from the spirit and scope of the invention.

What is claimed is:

1. An electro-optical latch comprising a photoconductive element sensitive to radiation in a first and second spectral range, said element exhibiting low resistance in the first range and high resistance in the second, and an electroluminescent element connected in electrical parallel circuit relationship with said photoconductor which produces light in the second range when activated and being optically coupled with said photoconductive element, means external to said electroluminescent element for selectively irradiating said photoconductive element with light in said first range and means external to said electroluminescent element for selectively irradiating said photoconductive element with light in said second range.

2. An electro-optical switching circuit comprising a first photoconductor element, an electroluminescent element and a second photoconductor element connected in a parallel electrical circuit relationship, said first photoconductor element being sensitive to radiation in at least two different spectral ranges, said first photoconductor element being conducting in a first of said ranges and quenched in the other, said electroluminescent element being positioned to irradiate only said first photoconductor element with light of a quenching wavelength, signal light means external to said electroluminescent element in a quenching spectral range coupled to said first photoconductor to selectively quench said first photoconductor wherein said electroluminescent element is maintained in a state of irradiation, a switching light signal coupled to said second photoconductor element for decreasing the internal resistance of said element whereupon said electroluminescent element ceases to maintain said condition of irradiation and a source of ambient radiation.

3. An electro-optical logic circuit comprising a plurality of first photoconductor elements, an electroluminescent element and a plurality of second photoconductor elements all of said elements being connected in parallel electrical circuit relationship, said first photoconductor elements being sensitive to radiation in at least two different spectral ranges, said first photoconductor elements being conducting in said first range and quenched in the other, said electroluminescent element being positioned to irradiate only said first photoconductor elements with light of a quenching wavelength, a separate signal light means external to said electroluminescent element for producing radiation in a quenching spectral range coupled to each of said first photoconductor elements to selectively quench same, wherein said electroluminescent element is maintained in a state of irradiation when all of said first photoconductor elements are in a quenched condition, separate switching light signal means coupled to each of said second photoconductor elements for decreasing the internal resistance of said elements whereupon said electroluminescent element ceases radiation when any of said second photoconductor elements receives a switching light signal, and a source of ambient radiation of said first spectral range coupled to said first photoconductor elements.

4. An electro-optical latch circuit comprising an electroluminescent element, a first photoconductor element in electrical series circuit relationship to said electroluminescent element, a second photoconductor element connected in parallel with the series combination of the electroluminescent element and said first photoconductor element, said electroluminescent element and said second photoconductor element being arranged in light exchange relationship, both of said photoconductor elements being sensitive to radiation in at least two different spectral ranges, said photoconductor elements being conducting in a first range and quenched in the other, signal light means external to said electroluminescent element in a quenching spectral range for selectively irradiating either of said photoconductor elements to selectively quench same, light signal means external to said electroluminescent element for irradiating said first photoconductor element with a strong pulse of light in said first spectral range concurrently with illumination of said second photoconductor element in said quenching spectral range wherein said electroluminescent element becomes active and maintains said circuit in a latched condition until said first photoconductor element is irradiated with light of said quenching spectral range.

References Cited in the file of this patent

UNITED STATES PATENTS

| | | |
|---|---|---|
| 2,885,564 | Marshall | May 5, 1959 |
| 2,900,522 | Reis | Aug. 18, 1959 |
| 2,985,757 | Jacobs et al. | May 23, 1961 |
| 2,995,660 | Lempicki | Aug. 8, 1961 |
| 3,039,005 | O'Connell et al. | June 12, 1962 |

FOREIGN PATENTS

| | | |
|---|---|---|
| 219,103 | Australia | Nov. 26, 1958 |

OTHER REFERENCES

Bube: Photoconductivity of the Sulfide, Selenide, and Telluride of Zinc or Cadmium, Proceedings of the IRE, December 1955, pages 1845 to 1846.